United States Patent
Campbell et al.

(10) Patent No.: US 6,286,088 B1
(45) Date of Patent: Sep. 4, 2001

(54) MEMORY MANAGEMENT SYSTEM AND METHOD FOR RELOCATING MEMORY

(75) Inventors: Russell Campbell, Boise; David L. Lanning, Eagle; Timothy P. Blair, Boise, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/340,601

(22) Filed: Jun. 28, 1999

(51) Int. Cl.[7] .............................. G06F 12/00; G06F 13/00
(52) U.S. Cl. .......................... 711/165; 711/100; 711/170; 711/171
(58) Field of Search ................................. 711/100, 165, 711/170, 171, 172

(56) References Cited

U.S. PATENT DOCUMENTS

| | | | |
|---|---|---|---|
| 5,491,785 | 2/1996 | Robson et al. | 395/162 |
| 5,524,186 | 6/1996 | Campbell | 395/115 |
| 5,550,954 | 8/1996 | Campbell et al. | 395/106 |
| 5,586,300 | 12/1996 | Wilcox et al. | 711/150 |
| 5,706,469 | 1/1998 | Kobayashi | 710/49 |
| 5,749,092 | 5/1998 | Heeb et al. | 711/138 |
| 5,809,228 | 9/1998 | Langendorf et al. | 395/185.06 |
| 5,809,317 | 9/1998 | Kogan et al. | 395/762 |
| 5,809,561 | 9/1998 | Sheffield et al. | 711/206 |
| 5,812,803 | 9/1998 | Pawlowski et al. | 395/309 |
| 5,819,079 | 10/1998 | Glew et al. | 395/584 |
| 5,835,958 | 11/1998 | Long et al. | 711/170 |
| 5,845,297 | 12/1998 | Grimsrud et al. | 707/205 |
| 5,857,213 | 1/1999 | Benhase et al. | 711/112 |
| 5,873,105 | 2/1999 | Tremblay et al. | 707/206 |
| 5,920,876 | 7/1999 | Ungar et al. | 707/206 |
| 5,920,896 | 7/1999 | Grimstrud et al. | 711/165 |
| 5,970,240 | 10/1999 | Chen et al. | 395/500.46 |

OTHER PUBLICATIONS

Structured Computer organization, Third Edition (Andrew S. Tanenbaum; 1990; pp. 338–343).

Primary Examiner—Tuan V. Thai

(57) ABSTRACT

A memory management system usable with a client is provided. The memory defines a memory space including at least one memory buffer, and the memory buffer is defined by a set of attributes including base address and size. The memory includes a fixed-simple memory allocation, having a link, and one of a relocatable simple memory allocation coupled with the link, a head of a complex memory allocation comprising multiple simple memory allocations, or a null simple memory allocation. A memory manager is coupled with the memory and is configured to manage specific instances of memory allocation usable by a client. A memory management interface is coupled with the memory manager and is configurable to enable a client to specify a request for a relocatable memory object. Processing circuitry is coupled with the memory and the memory management interface and is operative to detect a low memory condition. The memory manager is operative to relocate the memory object from one physical location in memory to another physical location in memory to generate a sufficiently large contiguous free memory block for the client so as to overcome the low memory condition. A method is also provided.

19 Claims, 5 Drawing Sheets

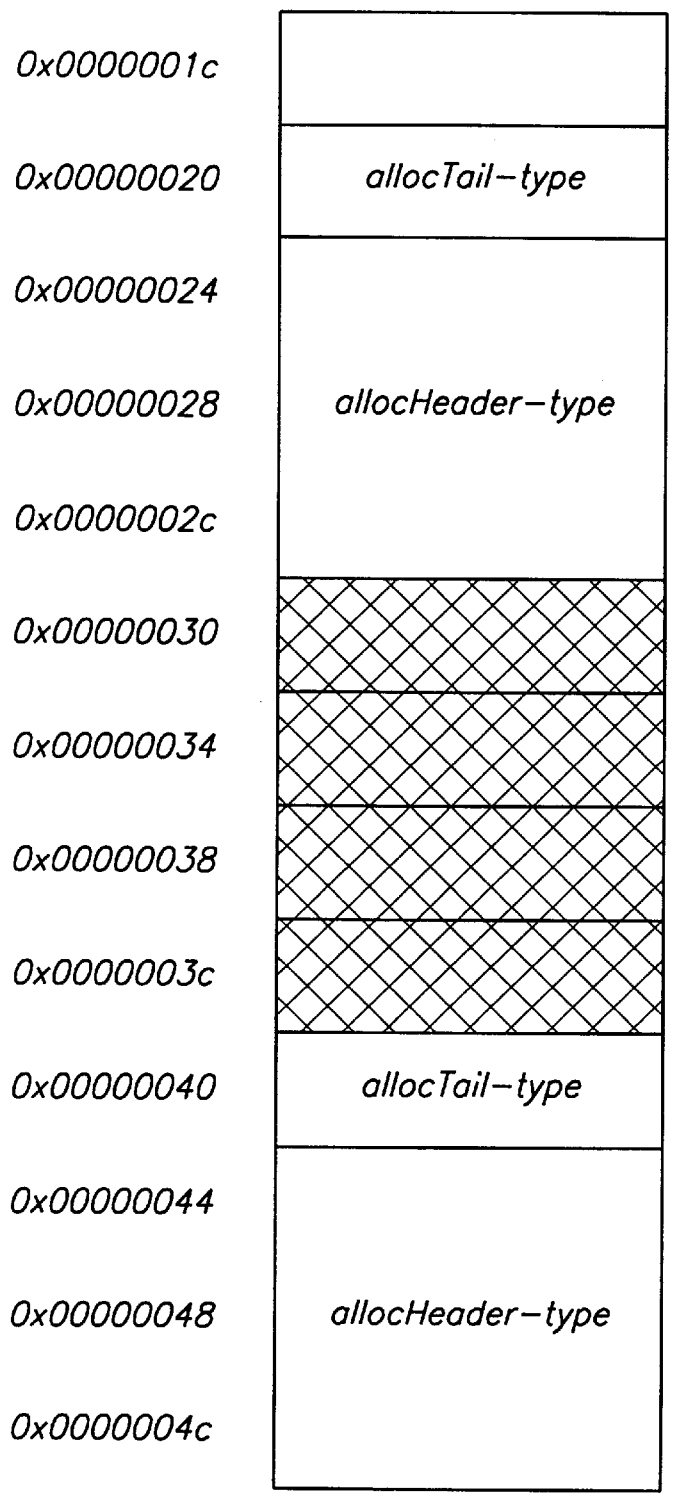

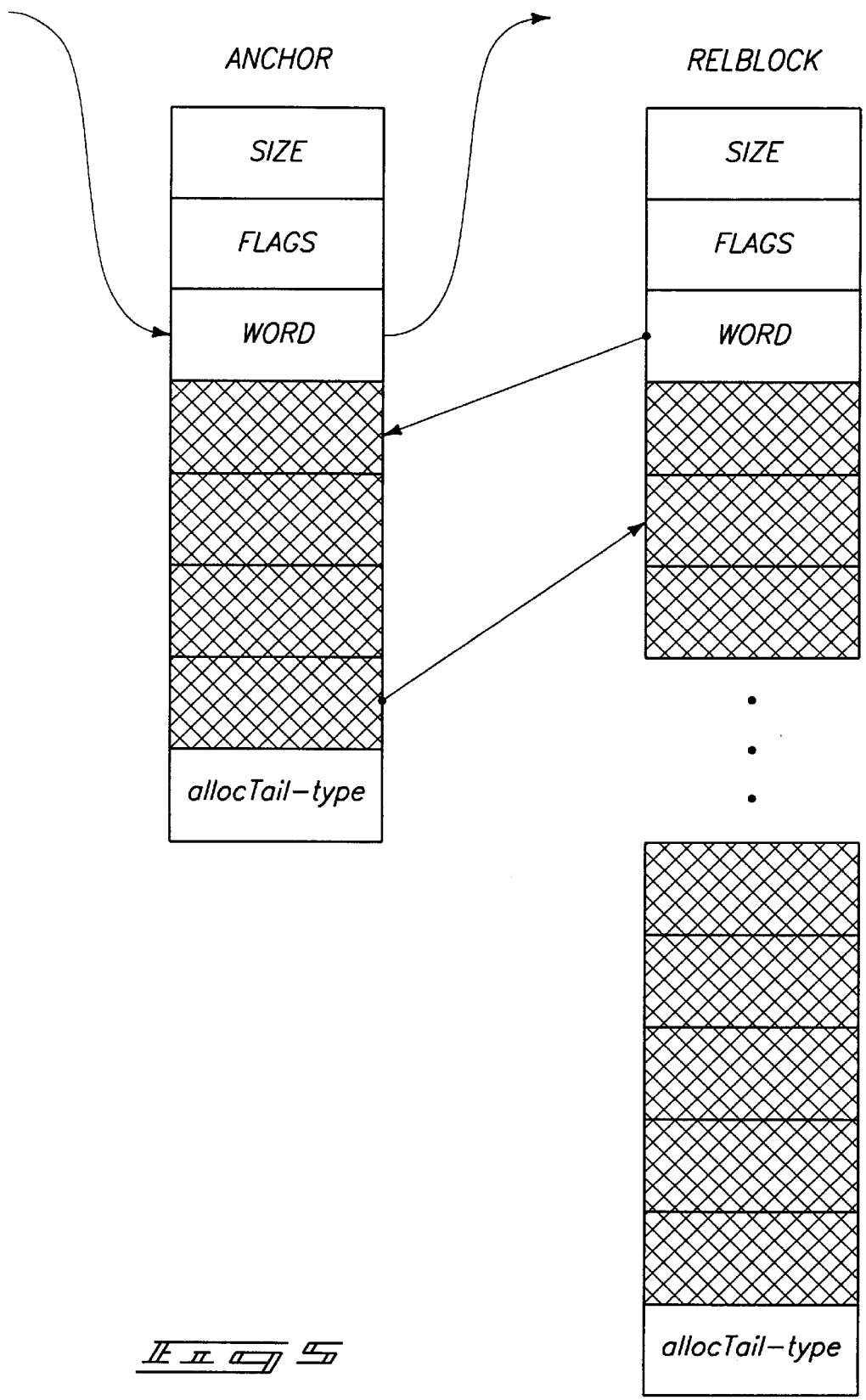

MEMORY MANAGEMENT SYSTEM AND METHOD FOR RELOCATING MEMORY

FIELD OF THE INVENTION

The present invention relates generally to personal computer and peripheral systems and, more particularly, to a method and apparatus for relocating memory by dynamically allocating data buffers in a manner that optimizes the memory allocations based upon space or speed, particularly when allocating complex data types.

BACKGROUND OF THE INVENTION

Personal computers, peripheral devices and data processing systems rely on memory when implementing operating systems and application programs. Techniques for managing memory are known in the art. For example, the delivery of print jobs to a printer involves the processing of a printer definition language (PDL). However, memory fragmentation is a problem encountered when processing a printer definition language (PDL). Memory fragmentation occurs when there is not enough contiguous memory.

For example, on some Hewlett-Packard LaserJet products, memory fragmentation has negatively affected throughput, and has resulted in memory outs. A memory out occurs when a block of requested memory is not available. Several firmware approaches are available which can alleviate this problem. First, data structures can be used which reside in fragmented memory. Secondly, fragmentation can be avoided by grouping like-sized or like-used allocations together. Thirdly, fragmentation can be reduced by relocating allocated memory objects to coalesce free space.

Several Hewlett-Packard LaserJet products have applied the first two approaches. For example, according to one implementation, the dissected compressed strip is provided as a data type that can reside in fragmented memory. According to another implementation, the personality scraps and array memory clients group like-sized allocations. According to a third implementation, various font memory clients group like-used allocations. Unfortunately the application of these techniques did not sufficiently alleviate the negative consequences of memory fragmentation for some products.

SUMMARY OF THE INVENTION

A technique is provided for reducing memory fragmentation by relocating allocated memory objects in order to coalesce free space. Pursuant to this technique, a method and an apparatus are provided for moving dynamically allocated buffers using a memory manager with data structures that embed self-referencing pointers in data buffers.

According to one aspect of the invention, a memory management system usable with a client is provided. The system includes memory which defines a memory space including at least one memory buffer, and the memory buffer is defined by a set of attributes including base address and size. The memory includes a fixed-simple memory allocation, having a link, and one of a relocatable simple memory allocation coupled with the link, a head of a complex memory allocation comprising multiple simple memory allocations, or a null simple memory allocation. A memory manager is coupled with the memory and is configured to manage specific instances of memory allocation usable by a client. A memory management interface is coupled with the memory manager and is configurable to enable a client to specify a request for a relocatable memory object. Processing circuitry is coupled with the memory and the memory management interface and is operative to detect a low memory condition. The memory manager is operative to relocate the memory object from one physical location in memory to another physical location in memory to generate a sufficiently large contiguous free memory block for the client so as to overcome the low memory condition.

According to another aspect of the invention, a method for relocating memory is provided. The method provides a memory; allocates a memory object, either relocatable or non-relocatable; requests an allocation of memory; assigns a fit for the memory object, then allocates a fit for the memory object; and determines if the allocation from free memory can be satisfied. If the allocation from free memory can be satisfied, then moving memory objects to different places in memory to get a sufficiently big free block of memory.

One advantage is provided in that already existing printer definition language code that is very large can be used make space available without having to rewrite the code to accommodate double indirection techniques.

DESCRIPTION OF THE DRAWINGS

Preferred embodiments of the invention are described below with reference to the following accompanying drawings depicting examples embodying the best mode for practicing the invention.

FIG. 4 is an outline of one complete NMC allocation beginning with a header at 0x00000024 and ending with a trailer at 0x00000040 for Applicant's invention wherein two padding words are incorporated into the NMC header to store additional allocation attribute values.

FIG. 5 is an outline of an Anchor and a RelBlock of a data type specified with a four-tuple and showing the respective NMC headers.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
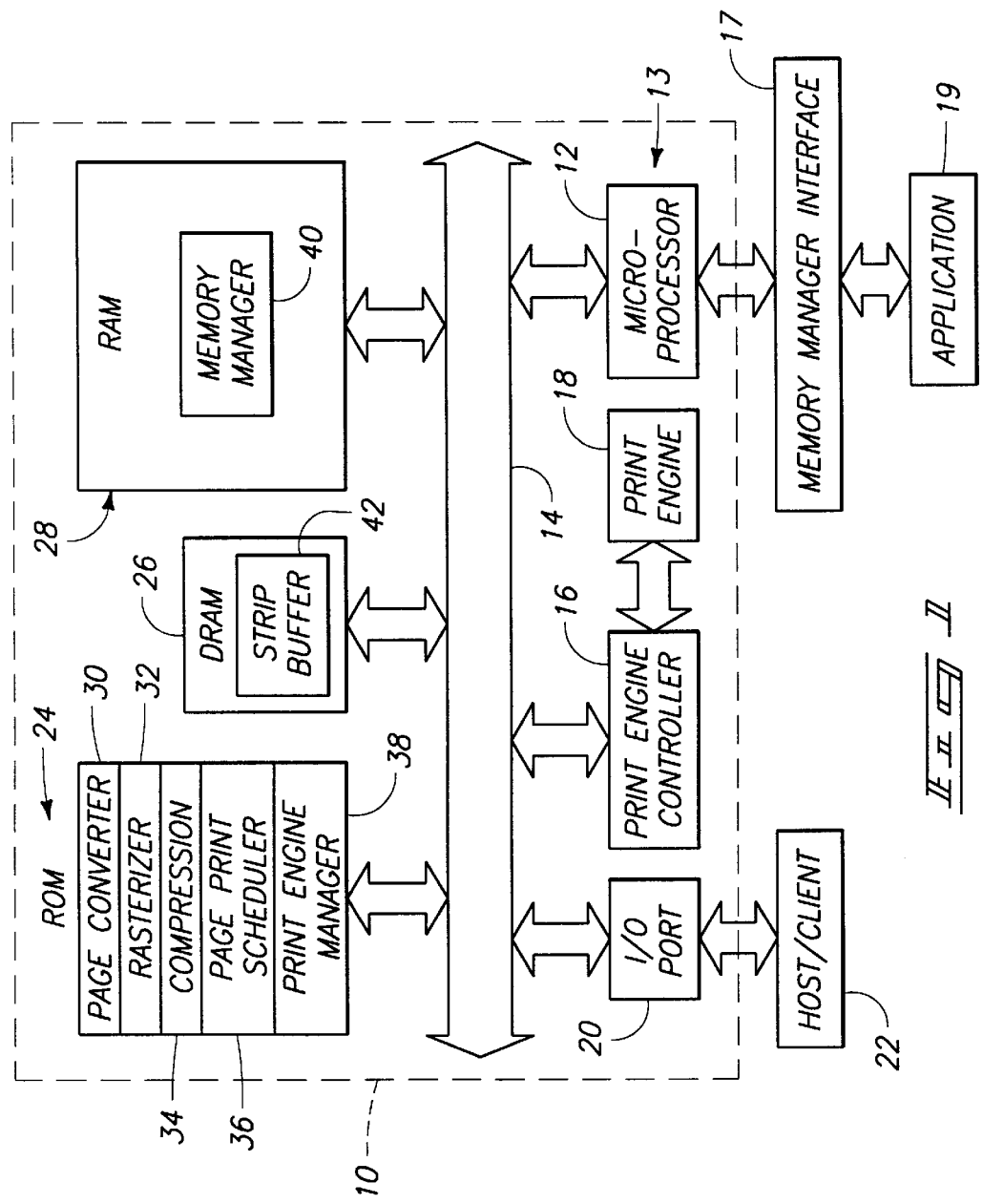
FIG. 1 is a high level block diagram of a printer that embodies the invention.

Referring to FIG. 1, a high level block diagram illustrates a page printer incorporating the invention and identified by reference numeral 10. Printer 10 is controlled by a microprocessor 12 comprising processing circuitry 13 that communicates with other elements of printer 10 via a system bus 14. A print engine controller 16 and associated print engine 18 couple with bus 14 to enable print output capabilities for printer 10. According to one implementation, print engine 18 comprises a laser printer having an electrophotographic imaging system pursuant to any implementation well known in the art.

An input/output (I/O) port 20 is coupled between bus 14 and a host computer 22 to enable communication between printer 10 and computer 22. In operation, I/O port 20 receives page descriptions from host computer 22 for processing within printer 10. A read only memory (ROM) 24 is provided for holding firmware that controls the operation of printer 10. A dynamic random access memory (DRAM) 26 is connected with system bus 14 and is operative to provide memory for printer 10. Furthermore, an additional random access memory (RAM) 28 is connected with system bus 14 and is operative to provide memory that may be assigned by a memory manager 40 to store rasterized page strip data. An external application program 19 communicates through a memory manager, or management, interface 17 via microprocessor 12 with memory manager 40. Memory management interface 17 indirectly couples with memory manager 40, and is configured to enable a client 22 to specify a request for a relocatable memory object via application program 19.

More particularly, ROM 24 contains various code procedures in the form of firmware including a page converter 30, a rasterizer 32, compression firmware 34, a page print scheduler 36, and a print engine manager 38. Page converter firmware 30 is operative to convert a page description that is received from host 22 to a display command list for individual page strips. Rasterizer 32 comprises firmware that is operative to convert individual display commands into an appropriate bit map that is stored in a page strip buffer 42. Compression firmware 34 is operative to compress the rasterized bit maps for more efficient storage in memory. Page print scheduler 36 is operative to control the sequencing and transfer of strip buffers 42 from DRAM 26 to print engine controller 16. Print engine manager 38 is operative to control operation of print engine controller 16. Memory manager 40 is operative to reallocate memory so as to optimize the allocations for either space or speed.

More particularly, DRAM 26 provides random access memory for printer 10. DRAM 26 comprises raster strip buffers 42 that are employed during page strip processing.

More particularly, RAM 28 provides additional memory that is assigned to store rasterized page strip data. RAM 28 may either be separate from DRAM 26 or be a part thereof. For purposes of this description, RAM 28 is considered a separate memory module.

A. Overall Design of the Preferred Embodiment of the Present Invention

In order to implement a memory relocation feature, several design changes are needed in order to implement this feature. A firmware approach is used to realize memory relocation. Several memory management design changes are implemented with presently understood printer hardware/software features to add the memory relocation feature.

The following requirements are needed in order to implement the memory relocation features of Applicant's invention. Namely, one requirement is that the memory management interface allow callers to specify requests for relocatable memory objects. Secondly, the memory management system should respond to low memory conditions by acting upon relocatable memory objects to defragment the memory space.

The following assumptions are made to realize Applicant's invention. First, many components call memory management entry points. For the case of printers, existing printer code turmoil will be minimized by preferring memory management interface flexibility over unifying the various data types declared by these components. Secondly, the preferred design will minimize code turmoil for existing printer designs.

B. Specific Design Approach for One Embodiment

For purposes of this exemplary implementation, let a simple-allocation be a memory buffer defined by a set of attributes including its base address and its size. The null simple-allocation is the special case defined with zero serving as both base address and size. Let a fixed simple-allocation be a simple-allocation defined with a base address that cannot change. Let a relocatable simple-allocation be a simple-allocation defined with a base address that can change. Let a complex-allocation be an allocation that can be satisfied by multiple simple-allocations that are reachable from a simple-allocation that is distinguished as the head. Then an Anchor is a fixed simple-allocation that points into a RelBlock, this RelBlock being either a relocatable simple-allocation that points back to this Anchor, the head of a complex-allocation of RelBlocks that point back to this Anchor, or the null simple-allocation.

C. Limitation of Double Indirection Technique

A memory manager responds to a request for a relocatable memory buffer by returning an Anchor. In a double indirection model, the Anchor is a pointer to a RelBlock. Whenever the memory manager moves this RelBlock, it also updates the Anchor. To access the RelBlock, users de-reference the Anchor.

For two reasons, double indirection is insufficient for supporting relocation on one printer configuration. First, many printer data structures already incorporate a pointer from a header into a data buffer (e.g., Hewlett-Packard LaserJet printer data structures). Applying the double indirection model to these data structures imposes three levels of indirection: from Anchor to RelBlock, from RelBlock to data, and finally data reference. This is unacceptable not only from a performance perspective, but also, given the third assumption stated above, from a code turmoil perspective.

Second, some printer data types that incorporate a pointer from a header into a data buffer (e.g. Laserjet) also embed self-referencing pointers in this data buffer. While such data types may otherwise be ideal candidates for relocation, double indirection cannot accommodate the embedded self-referential pointers. To avoid these disadvantages, Applicant's invention has defined a memory relocation model that is a superset of double indirection.

D. Generalization of Double Indirection Techniques

The Hewlett-Packard LaserJet printer data-types that we model consist of a header-structure that describes a data-section. A data-pointer is an element of the header-structure. This data-pointer addresses an offset into the data-section. The generalized double indirection model defines each relocatable data-type as a four-tuple (x, y, z, f), such that 1) x gives the size of the header-structure,
2) y gives the offset to the data-pointer element of the header-structure,
3) z gives the offset from the base of the data-section that the data-pointer must address, and
4) f gives the entry point for moving RelBlocks.

Figure 2:
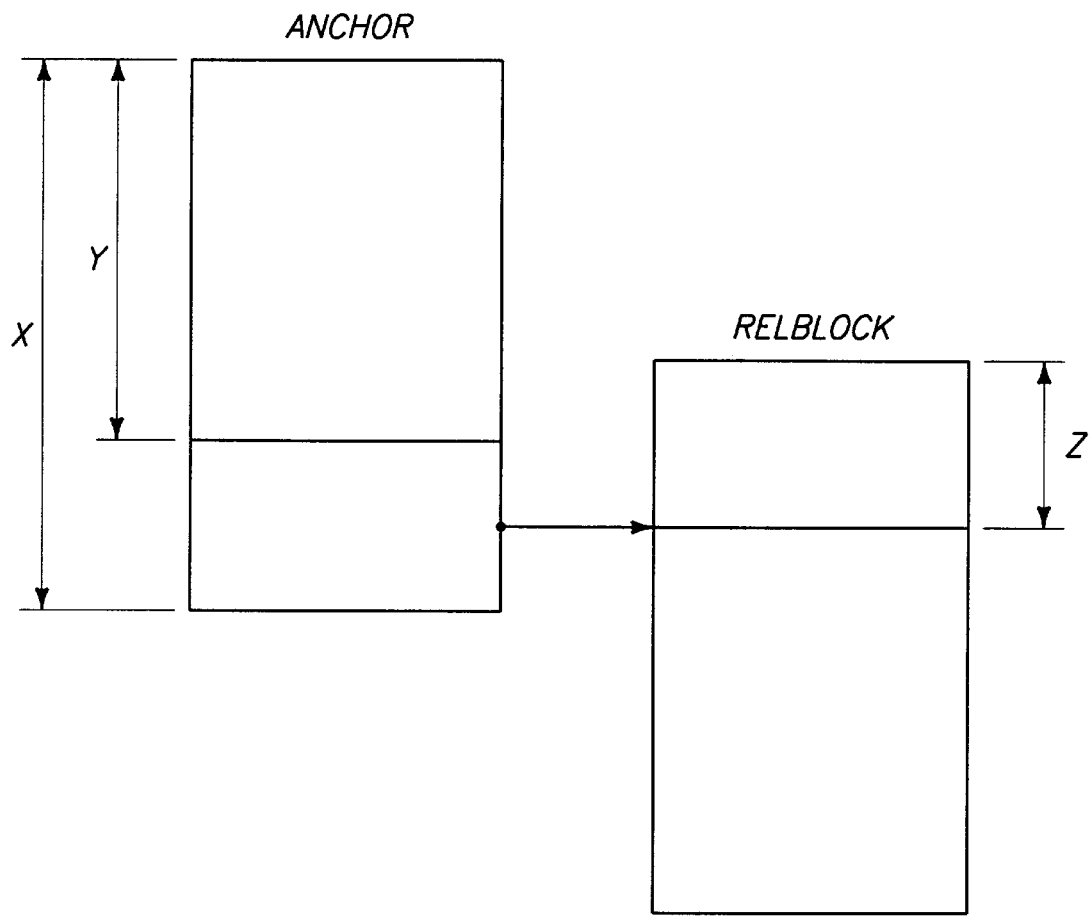
FIG. 2 is an outline of an Anchor and a RelBlock showing the first three elements of a four-tuple: x, y and z.

For a given data-type, an Anchor will buffer the header-structure, and an associated RelBlock will buffer the data-section. Thus x gives the size of an Anchor for this data-type, and 0 the pointer at offset y from the Anchor will address an offset of z into a RelBlock. Note that (sizeof(void*), 0, 0, memcpy) defines the special case for double indirection. A data type having self-referencing pointers embedded in a RelBlock must provide a move entry point that adjusts these embedded pointers. FIG. 2 shows the first three elements of the four-tuple.

Each defined relocatable data type is named by the index of its defining four-tuple in a table of relocatable data types. While memory management entry points to manipulate this table during program execution would be desirable in some applications, the memory manager builds this table during initialization after which its contents remain static. Data type name is an attribute of each simple-allocation.

Each simple-allocation is either an Anchor, a RelBlock, or neither. This status is an attribute of the simple-allocation. An Anchor has a pointer attribute that links it to a RelBlock. The value of this attribute must reside within the area defined by the base address and the size of the Anchor. This characteristic makes it unique among simple-allocation attributes; all other attribute values might reside at locations related to, but distinct from, this area. The Anchor's data type definition specifies the offset to the RelBlock pointer from the Anchor. The users of the Anchor de-reference this pointer to access the RelBlock.

RelBlocks have several attributes in addition to base address and size. A RelBlock has a pointer attribute that identifies its associated Anchor. A RelBlock could be the head of a complex-allocation. This status is a RelBlock attribute. It may be necessary for some components to control movement of certain RelBlocks during some operations. For this reason, lock state is included among the attributes of each RelBlock. Upon allocation, RelBlocks are locked. The memory manager will not move RelBlocks that are in this state. The memory manager might move RelBlocks that are unlocked. A memory management entry point allows callers to set the lock state of a RelBlock (or the RelBlocks associated with an Anchor) to either locked or unlocked. A memory management entry point reports the lock state of a RelBlock (or of the RelBlocks associated with an Anchor).

The memory manager provides an entry point that causes it to compact memory. This entry point could be called for a number of reasons, including when the system enters an idle state, or upon a failure of the memory manager to satisfy an allocation request. In Yukon, a failure of the memory manager to satisfy an allocation request when the page pipeline is empty results in a call to this entry point. In response to this call, the memory manager attempts to move unlocked RelBlocks to lower addresses, causing free spaces to coalesce at higher addresses. The memory manager accomplishes this movement by calling the move entry point specified for the data type of each selected RelBlock.

E. Details of Memory Architecture

1. PersMalloc()

```
void              *PersMalloc(  /* Pointer to allocation,        /*
                                   or NULL.
uint32            Size,         /* Requested size in bytes.      /*
enUserRelDataType RDT,          /* Relocatable data type, or     /*
                                   zero
uint32            MCF,          /* Control Flags.                /*
uint32            MFID,         /* Memory function I.D.          /*
MemControlExtension *PMCE       /* Pointer to extended           /*
                                   control structure
                  )
``` a. Size
   Size is the requested size of the allocation in bytes.
b. RDT
   RDT is either zero, or one of the defined relocatable data types enumerated by enUserRelDataType.
c. MCF
   MCF provides control flags for various memory management features.
These flags fall into several categories:
Life of Data
   Specify one of the following flags to indicate the expected life of the allocation.

MEM_CACHE_DATA: the page under composition will outlive the allocation.
MEM_PAGE_DATA: the page under composition and the allocation will have similar lifetimes.
MEM_JOB_DATA: the current job and the allocation will have similar lifetimes.
MEM_PERM_DATA: the allocation will survive the current job.

Effort
   Specify one of the following flags to indicate the amount of effort that the memory manager should exert in attempting to satisfy the allocation. This list is ordered with increasing effort. Each flag causes the previous action in addition to a new action.
MEM_NR_WAIT_CACHE: do callbacks
MEM_NR_WAIT_FLUSH: also flush the pipeline
MEM_NR_WAIT_RELOCATE: also compact memory
MEM_NR_WAIT_COMPRESS: also perform memory cycles
MEM_NR_WAIT_REPORT: also report memory out on failure Miscellaneous
   Specify any combination of these flags.
MEM_RELOCATABLE: allocate relocatable memory
MEM_ZERO_INIT: on success, zero initialize the buffer d. MFID
   MFID is a signature identifying the calling instance. This value is an attribute of the allocation, and is used for debugging.
e. pMCE
   pMCE provides additional information for complex-allocations. In one implementation, callers can request two kinds of complex-allocations:

(1) A linked-allocation is a null-terminated list of simple-allocations having one simple-allocation distinguished as its head.
   (2) A pointer-array is an array of pointers into fixed-size rows of specified alignment. Distinct simple-allocations can buffer each row and the array. The simple-allocation buffering the array serves as the head of the pointer array.

Define the structure MemControlExtension as follows:

```
typedef struct (
uint16 Type;              /* Determine the type of the extended data */
) MemControlExtension;
```

For linked-allocations, cast the following structure to MemControlExtension:

```
typedef struct mcs_lb (
uint16 Type;          /* Must be MEM_MCS_LINKED_      */
                         BUFFER
uint16 Reserved16;    /* Reserved and must be O       */
uint32 Reserved32;    /* Reserved and must be O       */
uint16 LinkOverhead;  /* The user overhead per link in bytes */
uint16 MinLinkSize;   /* The minimum link size, in bytes */
uint32 Flags;         /* Allocation flags             */
uint32 SizeReturned;  /* Returned: The total size of the linked */
                         buffer
) MCS_LB;
```

For pointer-arrays, cast the following structure to MemControlExtension:

```
typedef struct mcs_pa
uint16  Type;         /* Must be MEM_MCS_POINTER_ARRAY  */
uint16  Rows;         /* The number of rows required    */
uint32  Reserved32;   /* Reserved and must be O         */
uint16  Alignment;    /* The row alignment              */
uint16  ReturnType;   /* Returned: the type of pointer array */
uint32  Flags;        /* Allocation flags               */
) MCS_PA;
``` f. Returns

This function returns a pointer to a suitable buffer on success, and to null otherwise.

```
2. PersFree()
uint32   PersFree(    */ Number of bytes freed        */
void     *pAllocation, */ Pointer to allocation       */
uint32   MCF,          */ Control flags               */
uint32   PageNumber    */ Associated page number, or O */
)
``` a. pAllocation pAllocation is a pointer to an allocation previously returned by PersMalloc().

b. MCF

MCF is either MEM_IMMEDIATE or MEM_DELAYED. Where MCF is MEM_IMMEDIATE, the memory manager will free pAllocation immediately. Where MCF is MEM_DELAYED, and PageNumber is 0, the memory manager will free pAllocation after the page under composition is printed. Where MCF is MEM_DELAYED, and PageNumber is not 0, the memory manager will free pAllocation after the page identified by PageNumber is printed.

c. PageNumber

Where (MCF & MEM_DELAYED), PageNumber is the unique page I.D. for the page that must print before pAllocation is freed, with a PageNumber of zero identifying the page under composition. Where (MCF & MEM_IMMEDIATE), pAllocation is freed immediately, and PageNumber must be 0.

d. Returns

This function returns the number of bytes freed.

```
3. PersSetLockState()
enumRelErrorType  PersSetLockState(  /* Error return code    */
uint32            *pAllocation,      /* Pointer to allocation */
enumRelLockState  State              /* Requested lock state  */
)
``` a. pAllocation pAllocation is a pointer to an allocation previously returned by PersMalloco().

b. State

State is either MEM_LOCKED or MEM_UNLOCKED.

C. Returns

The function returns epsNoError on success, and epsError otherwise.

```
4. PersGetLockState()
enumRelErrorType  PersSetLockState(  /* Error return code    */
uint32            *pAllocation       /* Pointer to allocation */
)
``` a. pAllocation pAllocation is a pointer to an allocation previously returned by PersMalloc().

b. Returns

The function returns either MEM_LOCKED or MEM_UNLOCKED.

```
5. 2.5 nmc_Compaction()
void              nmc_Compaction(
memoryClient_type *pClient            /* Pointer to memory */
                                         client
)
``` a. pClient pClient is a pointer to the memory client to compact.

F. Implementation Details

For one recent application, we adapted NMC allocations to the quadword alignment constraints of the MIPS architecture by adding two words of padding to the two words of NMC overhead, and rounding the size of the user's buffer up to a quadword multiple. Where the first user buffer of an NMC segment falls on a quadword boundary, the four words of overhead along with a quadword-multiple-sized buffer ensure that the remaining user buffers in this segment fall at quadword boundaries.

Figure 3:
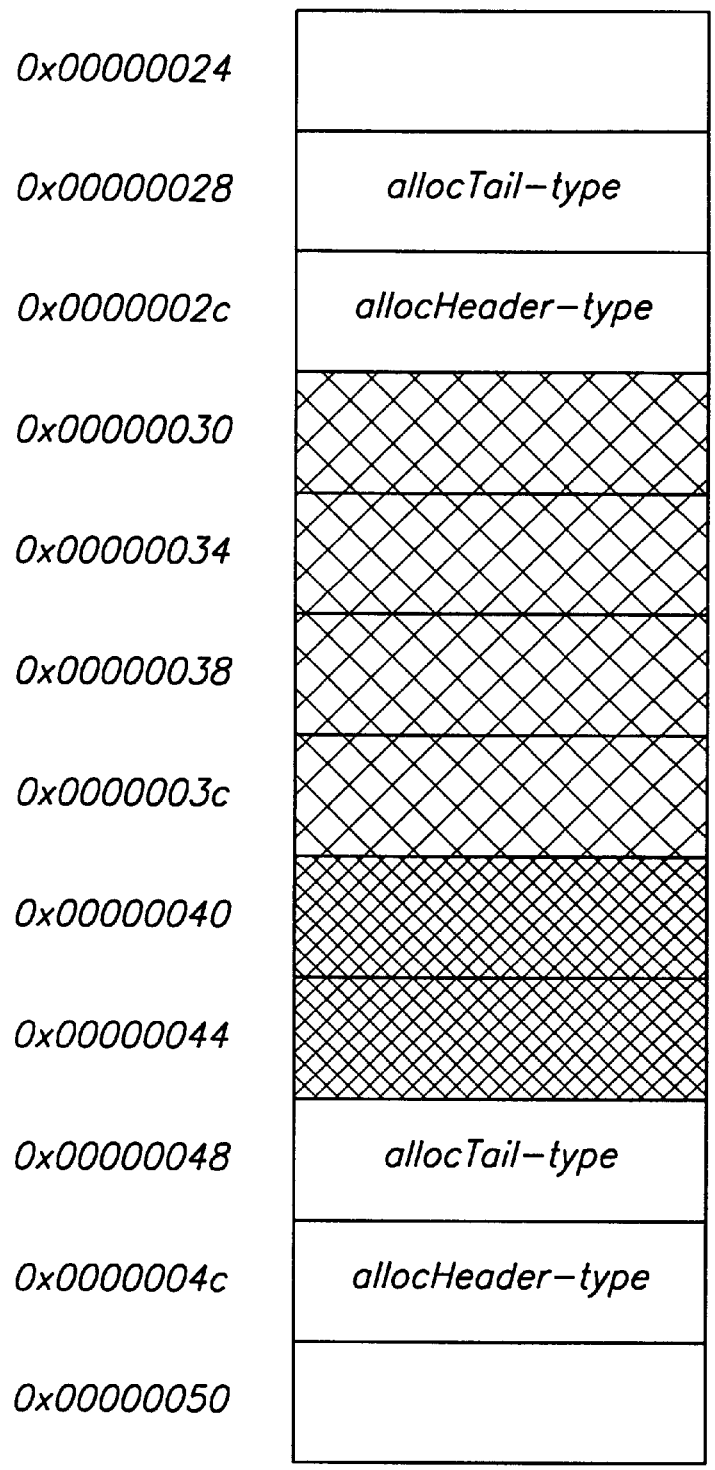
FIG. 3 is an outline of one complete NMC allocation beginning with a header at 0x0000002C and ending with a trailer at 0x00000048 for a related art memory allocation implementation.

FIG. 3 shows one complete NMC allocation beginning with a header at 0x0000002C and ending with a trailer at 0x00000048. The lightly shaded area represents the user's buffer, and the remaining two darkly shaded words represent the padding.

In one printer application, two padding words were incorporated into the NMC header to store additional allocation attribute values. FIG. 4 shows this change. Since the padding overhead was previously unused, the NMC header can be expanded without increasing overhead.

FIG. 5 shows the NMC header for the Anchor and RelBlock of a data type specified with a four-tuple in ((4*sizeof(int), 3*sizeof(int), 1*sizeof(int), ƒ)). The size of the allocation is encoded as it has been for previous products. The size corresponds with the size of the shaded area that is given by (—size–sizeof(allocHeader_type)–sizeof(allocTail_type). Flags and Word store additional attributes. For the anchor, a Word provides storage for linking the Anchor into a delayed deallocation queue. For a RelBlock, the Word stores a pointer to the base of the user's buffer within the RelBlock's Anchor. Note that the Anchor's pointer into its RelBlock resides in the shaded area of the Anchor; it is stored within the user's buffer. Flags stores the remaining attributes of a simple-allocation.

G. Additional Features

The work that is complete suggests several improvements can also be added to the embodiment described above. First, typically we find that Anchors do not serve as either the source or destination of DMA operations, and thus are not constrained to fall at quadword boundaries. By stating this as a restriction, overhead can be reduced by allocating Anchors using a suballocation package that is less general than NMC. AMC might serve this purpose. Such implementation would reduce the memory space overhead as well as the path length associated with Anchor allocations.

To achieve this, we would have to in some way generalize the currently NMC-centric nature of our Pers*() memory interface. For example, PersFree() would have to serve multiple objects: those allocated by NMC and those allocated by AMC. The multiple_allocators branch branches initial experimental work with this generalization.

Second, the first steps toward relocation have concentrated upon providing the mechanism for relocation, and enabling relocation for major data types. The algorithm for compacting memory has seen little improvement from our earliest prototypes. The "rskenned_moveslide" branch branches several experimental improvements to the compaction algorithm. These include:
1. allowing Relblocks to move across NMC segment boundaries, and over nonrelocatable allocations;
2. providing for segregation of nonrelocatable allocations with a bidirectional freelist search; and
3. maintaining a sorted freelist.

Third, relocation does not address memory space fragmentation created by multiple NMC clients. Each client builds a distinct address space with pages allocated from the MPA. The "relo_mono" branch branches experimental work to replace the MPA with a master NMC client. NMC clients managing fixed pools manage memory allocated from the master NMC client. All nonfixed clients map to the master client. In this model, multiple clients no longer compartmentalize the address space. Thus compaction can act upon a larger contiguous space.

Fourth, compaction currently does not occur until after the page pipeline flushes. Allowing compaction before the pipeline flushes could reduce the number and length of low memory induced pauses.

Fifth, additional memory management efficiencies can be incorporated. Some of the higher level memory management functions make their home in "pslax.c". Some of these functions require services from static functions residing in "pslibmem.c". Those that do must call externally available "pslibmem.c" functions that in turn call these static functions. This is not only unwieldy, but also adds path length unnecessarily. Also, some lower level functions belonging to other subsystems make their home in "pslax.c". AN improvement can further be made by evicting these functions, possibly after assisting them in finding a more appropriate home, and then to relocate the "pslax.c" memory management functions to "pslibmem.c". "pslax.c" can then be "sold", so to speak, to the highest bidder, or at least remove its reference from the makefile.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A memory management system usable with a client, comprising:
   memory defining a memory space including at least one memory buffer, the memory buffer defined by a set of attributes including base address and size, the memory including a fixed-simple memory allocation, having a link, and one of:
   a. a relocatable simple memory allocation coupled with the link,
   b. a head of a complex memory allocation comprising multiple simple memory allocations, or
   c. a null simple memory allocation;
   a memory manager coupled with the memory and configured to manage specific instances of memory allocation usable by a client by implementing a generalized double indirection memory relocation model of datatypes;
   a memory management interface coupled with the memory manager and configurable to enable a client to specify a request for a relocatable memory object;
   processing circuitry coupled with the memory and the memory management interface and operative to detect a low memory condition;
   wherein the memory manager is operative to relocate the memory object from the one physical location in memory to another physical location in memory in generate a sufficiently large contiguous free memory block for the client so as to overcome the low memory condition;
   wherein the memory manager allocates a relocatable memory object via the double indirection memory relocation model comprising relocatable data-types as a four-tuple (x, y, z, f), such that: x gives the size of a header-structure that describes a data-section; y gives an offset to a data-pointer element of the header-structure; z gives an offset from a base of the data-section that the datapointer must address; and f gives an entry point for moving the one of the relocatable simple-allocation, the head of the complex memory allocation, and the null simple memory allocation.

2. The memory management system of claim 1 wherein the link of the fixed-simple memory allocation comprises a pointer.

3. The memory management system of claim 1 wherein the memory manager allocates a non-relocatable memory object.

4. The memory management system of claim 1 wherein the memory manager is configured to allocate a memory object, and wherein the memory manager is operative to assign and allocate a fit for the memory object.

5. The memory management system of claim 1 wherein the memory manager is configured to allocate memory objects, and wherein the memory manager is operative to move memory objects to different locations in memory in order to coalesce a free block of memory.

6. The memory management system of claim 1 wherein the memory manager is configured to identify relocatable memory objects.

7. The memory management system of claim 1 wherein the memory manager is operative to move the identified relocatable memory objects.

8. The memory management system of claim 1 further comprising a print engine, the memory manager operative to relocate memory objects to receive print jobs.

9. A method for relocating memory, comprising:
   providing a memory;
   allocating a memory object, either relocatable or non-relocatable, using a generalized double indirection memory relocation model of data-types;
   requesting an allocation of memory;
   assigning a fit for the memory object, followed by allocating a fit for the memory object;
   determining of the allocation from free memory can be satisfied; and if the allocation from free memory can be satisfied, then moving memory objects to different places in memory to get a sufficiently big free block of memory;

wherein allocating the relocatable memory object via the double indirection memory relocation model comprising relocatable data-types as a four-tuple (x, y, z, f), such that: x gives a size of a header-structure that describes a data-structure; z gives an offset from a base of the data-section that the datapointer must address; and f gives an entry point for moving the one of the relocatable simple-allocation, a head of a complex memory allocation, and a null simple memory allocation.

10. The method of claim 9 wherein the memory manager allocates a relocatable memory object.

11. The method of claim 9 wherein the memory manager allocates a non-relocatable memory object.

12. The method of claim 9 wherein the step of moving memory objects to different places in memory comprises coalescing a free block of memory.

13. The method of claim 9 wherein the steps of assigning a fit and allocating a fit cooperate to generate a fit.

14. The method of claim 9 wherein the step of moving memory objects comprises relocating memory objects to receive a print job.

15. A method for relocating memory for relocating memory, comprising:

allocating a memory object using a generalized double indirection memory relocation model of data-types;

requesting an allocation of memory from the memory;

generating a fit for the memory object within the requested allocation of memory;

determining if the allocation of memory can be satisfied from the existing free memory; and if the allocation from free memory can be satisfied, then moving memory objects to different places in memory to coalesce a free block of memory;

wherein allocating a relocatable memory object via the double indirection memory relocation model comprising relocatable data-types as a four-tuple (x, y, z, f), such that: x gives a size of a header-structure that describes a data-section; y gives an offset to a datapointer element of the header-structure; z gives an offset from a base of the data-section that a datapointer must address; and f gives an entry point for moving the one of the relocatable simple-allocation, a head of a complex memory allocation, and a null simple memory allocation.

16. The method of claim 15 wherein the coalesced free block of memory is sufficient to meet the requested allocation of memory.

17. The method of claim 15 wherein the allocated memory object is relocatable.

18. The method of claim 15 wherein the allocated memory object is non-relocatable.

19. The method of claim 15 wherein the step of generating a fit for the memory object comprises assigning a fit for the memory object, then allocating a fit for the memory object.

* * * * *